Figure 1:
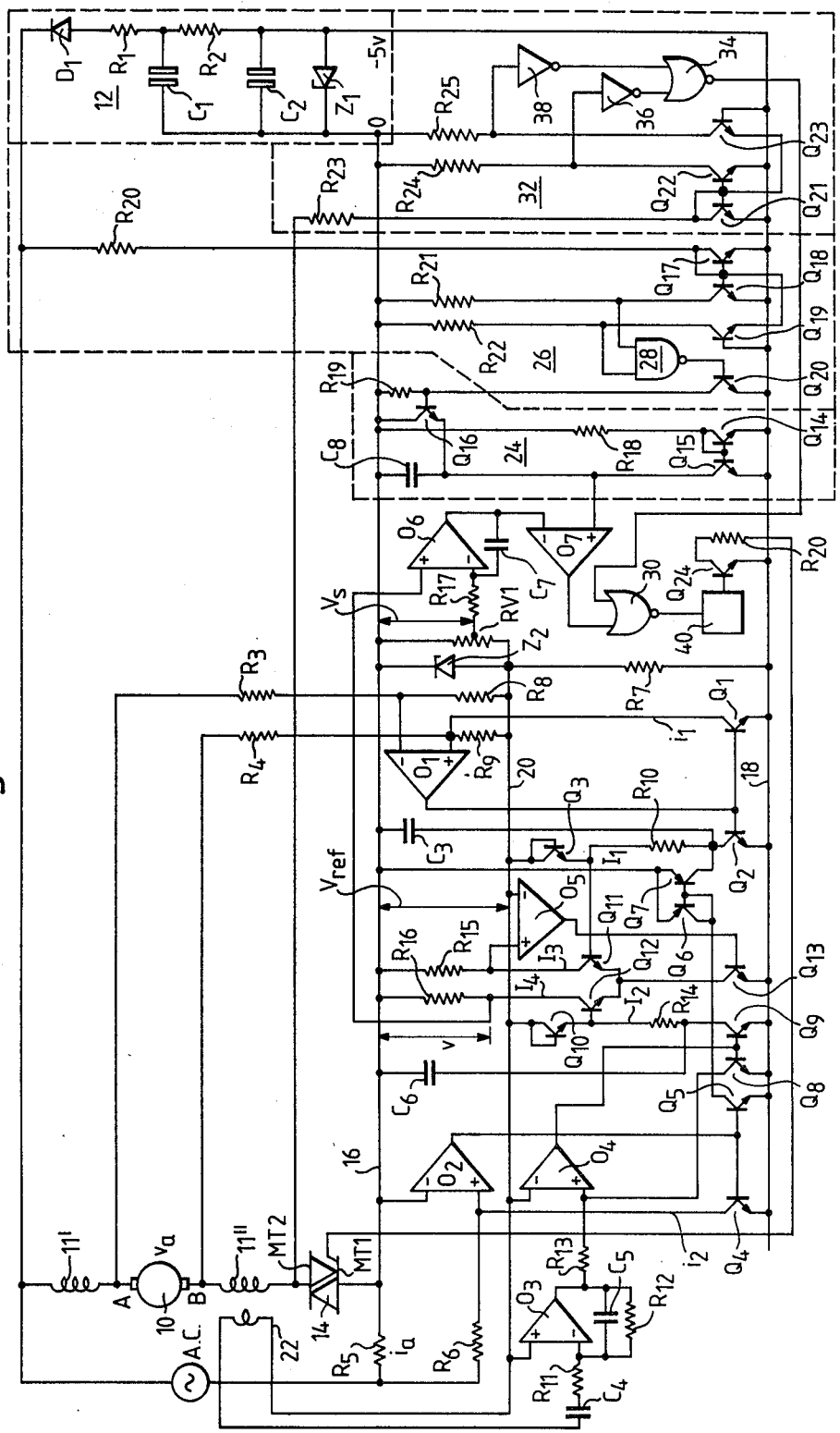

United States Patent [19]

Bishop

[11] Patent Number: 4,481,448
[45] Date of Patent: Nov. 6, 1984

[54] AUTOMATIC ELECTRICAL MOTOR SPEED CONTROL

[75] Inventor: Malcolm J. Bishop, Oldham, England

[73] Assignee: Ferranti, PLC, Cheshire, England

[21] Appl. No.: 510,235

[22] Filed: Jul. 1, 1983

[30] Foreign Application Priority Data

Jul. 17, 1982 [GB] United Kingdom ............... 8220800

[51] Int. Cl.³ .............................................. H02P 5/40
[52] U.S. Cl. ..................................... 318/248; 318/245; 318/331; 318/338; 318/345 D
[58] Field of Search ................... 318/331, 345 D, 339, 318/301, 244, 246, 248, 249, 332, 341, 245, 338, 342

[56] References Cited

U.S. PATENT DOCUMENTS

| | | | |
|---|---|---|---|
| 3,443,188 | 5/1969 | Mortimer | 318/245 D X |
| 3,783,361 | 1/1974 | Mason | 318/331 |
| 4,152,632 | 5/1979 | Peterson | 318/332 X |
| 4,168,455 | 9/1979 | Soeda et al. | 318/331 |
| 4,259,623 | 3/1981 | Moeder et al. | 318/249 |
| 4,326,153 | 4/1982 | Contri | 318/345 D X |

FOREIGN PATENT DOCUMENTS

| | | | |
|---|---|---|---|
| 2022882 | 12/1979 | United Kingdom | 318/338 |
| 1576062 | 10/1980 | United Kingdom | . |
| 2058405 | 4/1981 | United Kingdom | . |

Primary Examiner—J. V. Truhe
Assistant Examiner—Bentsu Ro
Attorney, Agent, or Firm—Kerkam, Stowell, Kondracki & Clarke

[57] ABSTRACT

An automatic speed controller for a universal, series-wound, electrical motor, is part of a system whereby the motor is energized by a A.C. supply from control means including a triac, in turn, controlled by the speed controller. Within the controller signals are derived comprising solutions of the equation:

$$N = \frac{V_a - I_a R_a}{K \phi_{AV}},$$

or a derivative thereof, or an approximation thereof, where N is the armature speed, $R_a$ is the resistance of the armature, K is a constant dependent upon the motor design, $(V_a - I_a R_a)$ is the true average of the alternating quantity $(v_a - i_a R_a)$, where $v_a$ and $i_a$ are, respectively, the instantaneous armature voltage and current, and $\phi_{AV}$ is the true average flux in the magnetic circuit of the motor, both true averages being obtainable when the motor is operating under steady state conditions. Each derived signal is compared with a reference signal representative of the required armature speed, and any error signal, so provided, is caused to vary the average energy supplied to the motor in consecutive half cycles of the motor supply, so as to tend to reduce the error.

6 Claims, 3 Drawing Figures

AUTOMATIC ELECTRICAL MOTOR SPEED CONTROL

This invention relates to systems employing the automatic speed control of universal, series-wound, electrical motors, in each such system, the motor to be energised by an A.C. electrical supply from control means, the control means being arranged to be controlled, in turn, by an automatic motor speed controller. The control means to apply the A.C. electrical supply to the motor, in particular, comprises a triac, with phase angle control.

Further, the present invention relates to automatic speed controllers, each comprising a system in which signals, each representative of the instantaneous motor armature speed, are derived by the automatic speed controller from determinations of the magnitudes of a parameter, or parameters, associated with the manner of operation of the motor, instead of direct determinations of the speeds by a tacho. The controller includes means to compare each such derived signal with a reference signal provided by control-point-determining means of the controller, each reference signal having a parameter the magnitude of which is representative of a predetermined armature speed. In response to the comparing means detecting any difference between the armature speed represented by the derived signal and the predetermined armature speed represented by the reference signal, the comparing means provides an error signal, causing a control signal to be provided to the control means. In turn, there is caused to be supplied to the motor the required average of the A.C. electrical energy, the electrical energy to be supplied to the motor in each half cycle associated therewith to vary between consecutive half cycles, so as to tend to reduce any detected difference between the derived and the predetermined armature speeds. For convenience, in this specification such a system will be referred to as a system of the type referred to.

The automatic speed controller may be energised by supplying thereto the A.C. system supply when rectified and smoothed.

It is advantageous to use a triac in the control means for the motor, because an A.C. supply for the system is usually readily available, and complex triggering circuitry is not required. However, when deriving the instantaneous motor armature speed from the motor operating characteristics, it is not desirable to ignore the voltage due to field induction, which is out of phase with the back e.m.f. generated in the armature.

It is possible to derive the instantaneous motor armature speed in several different ways, with a system of the type referred to, some of these ways being more accurate, and/or being more complex than others in deriving the instantaneous motor armature speed when different torques are applied to the motor.

It is an object of the present invention to provide an automatic speed controller for a system of the type referred to, the system employing the automatic speed control of a universal, series-wound, electrical motor, the motor to be energised by an A.C. electrical supply, and in which system there are derived representations of the instantaneous motor armature speeds, by the automatic speed controller, in a novel and advantageous way.

According to the present invention, in a system of the type referred to, an automatic speed controller, for a universal, series-wound, electrical motor, to be energised by an A.C. electrical supply, includes computing means having rectifying and filtering means, and responsive both to input signals having a parameter the magnitudes of which are representative of instantaneous armature voltages $v_a$, input signals having a parameter the magnitudes of which are representative of instantaneous armature currents $i_a$, and input signals having a parameter the magnitudes of which are representative of instantaneous flux values in the magnetic circuit of the motor, in response to such input signals the computing means to derive signals, each such derived signal comprising a D.C. voltage having a magnitude which is representative of the armature speed N, from the solution of the equation:

$$N = \frac{V_a - I_a R_a}{K \phi_{AV}},$$

or a derivative thereof, or an approximation thereof, where $R_a$ is the resistance of the armature, K is a constant dependent upon motor design, and $(V_a - I_a R_a)$ is the true average of the alternating quantity $(v_a - i_a R_a)$, and $\phi_{AV}$ is the true average flux value, both as hereinafter defined.

The armature voltage, the armature current, and the flux in the magnetic circuit of the motor, vary within each half cycle of the A.C. electrical supply to the motor.

When the motor is operating under steady state conditions the averages of the alternating quantities $(v_a - i_a R_a)$, and the flux $\phi$, both over a half cycle of the A.C. electrical supply to the motor, are considered to be the true averages. When the motor is not operating under steady state conditions, and control signals are provided to the control means, inherently, the computing means does not operate upon signals representative of the true averages of the alternating quantities, but, in accordance with the present invention, the computing means is arranged to operate upon signals representative of approximately the true averages, and possibly representative of the same proportions of the two true averages, and considered to be derived from the true averages. For convenience, hereinafter in this specification only the true averages will be considered.

In the computing means, rectifying and filtering means may be provided individually for the derivative of the signals representative of the quantities $(V_a - I_a R_a)$, and $\phi_{AV}$, from the instantaneous armature voltages $v_a$, and the instantaneous armature currents $i_a$. The time constants associated with the two rectifying and filtering means may be long compared with the period of the A.C. electrical supply to the motor. In addition, or alternatively, the time constants associated with the two rectifying and filtering means may be closely matched.

The input signals to the computing means representative of instantaneous flux values may be derived from the time integral of the voltage induced within a coil wrapped around one of the poles of the stator of the motor, the coil being included within the system. The voltage induced in the coil is equal to the product of the number of turns of the coil and the rate of change of the magnetic flux within the pole of the motor. Thus, the integral of the induced voltage with respect to time is proportional to the instantaneous flux.

Alternatively, the arrangement may be such that the input signals to the computing means representative of instantaneous flux values $\phi$, in the magnetic circuit of the motor, are derived from the time integral of the voltage $V_F$ developed across a field coil of the motor, but, since the motor current flows in the winding of the field coil, the instantaneous voltage $V_F$ developed across the field coil is equal to the product of the number of turns of the coil $n_F$ and the rate of change of flux within the pole of the motor, plus the product of the instantaneous motor current $i_a$, and the resistance $R_F$ of the winding of the field coil:

$$V_F = n_F \frac{d\phi}{dt} + i_a R_F$$

so that a voltage equal to the product of the instantaneous motor current and the resistance of the field coil is subtracted from the instantaneous voltage $V_F$ developed across the field coil before the integration is performed:

$$\phi = \int \frac{(V_F - i_a R_F)}{n_F} dt$$

Conveniently, the computing means includes an analogue dividing arrangement, the analogue dividing arrangement possibly including a long-tailed pair of transistors, comprising a pair of transistors in a differential circuit configuration.

Advantageously, signal currents represent the magnitudes from which the required solutions of the equation are derived.

According to another aspect, the present invention comprises a monolithic semiconductor device in which there is embodied at least a major part of an automatic motor speed controller, of a system of the type referred to, and of any one of the forms referred to above.

Figure 2:
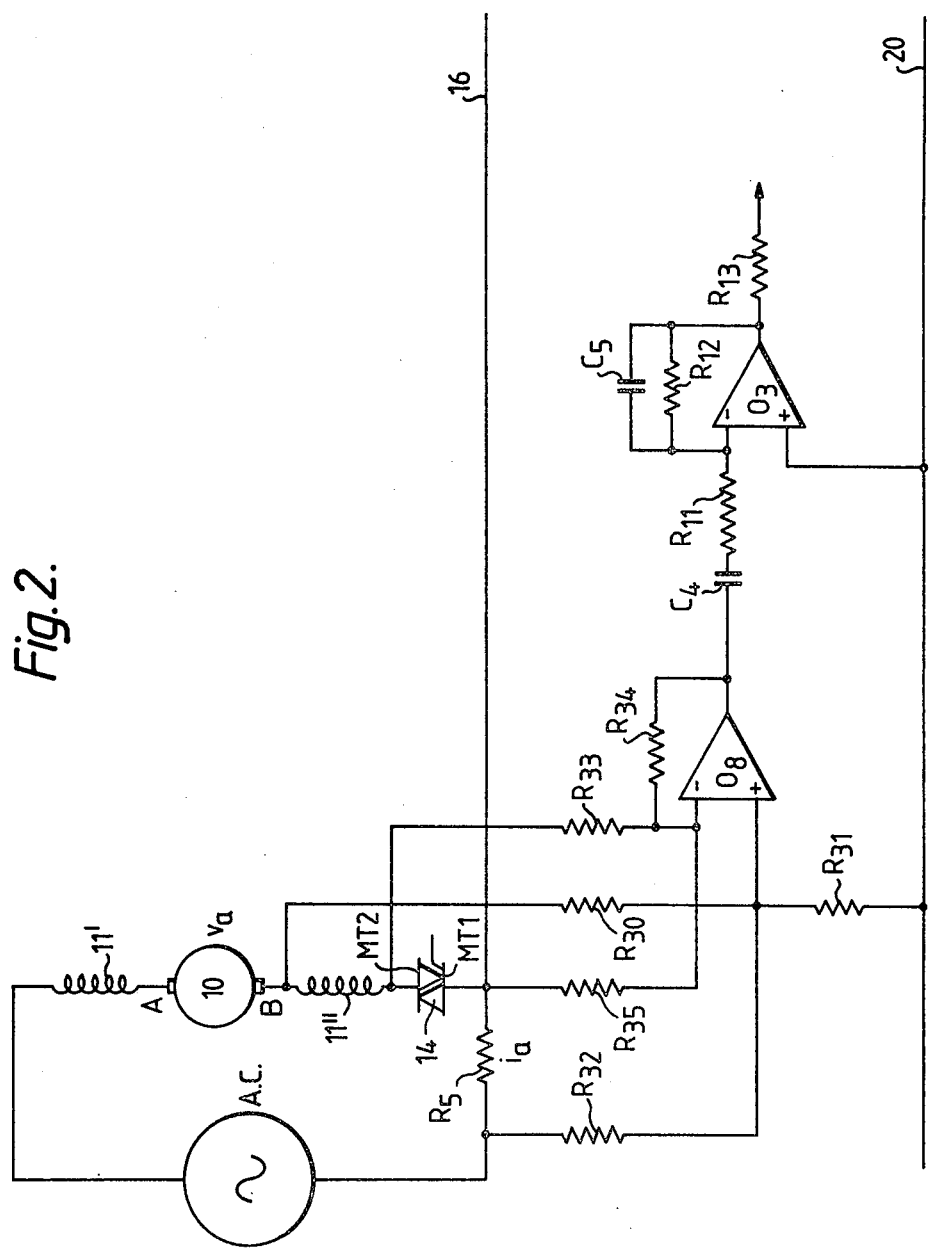

The present invention will now be described by way of example with reference to the accompanying drawings, in which FIG. 1 is a circuit diagram of one embodiment of a system of the type referred to, employing the automatic speed control of a universal, series-wound, electrical motor, the motor to be energised by an A.C. electrical supply from control means, the control means being arranged to be controlled, in turn, by an automatic motor speed controller, and FIG. 2 is a modification of part of the circuit of FIG. 1.

Figure 3:
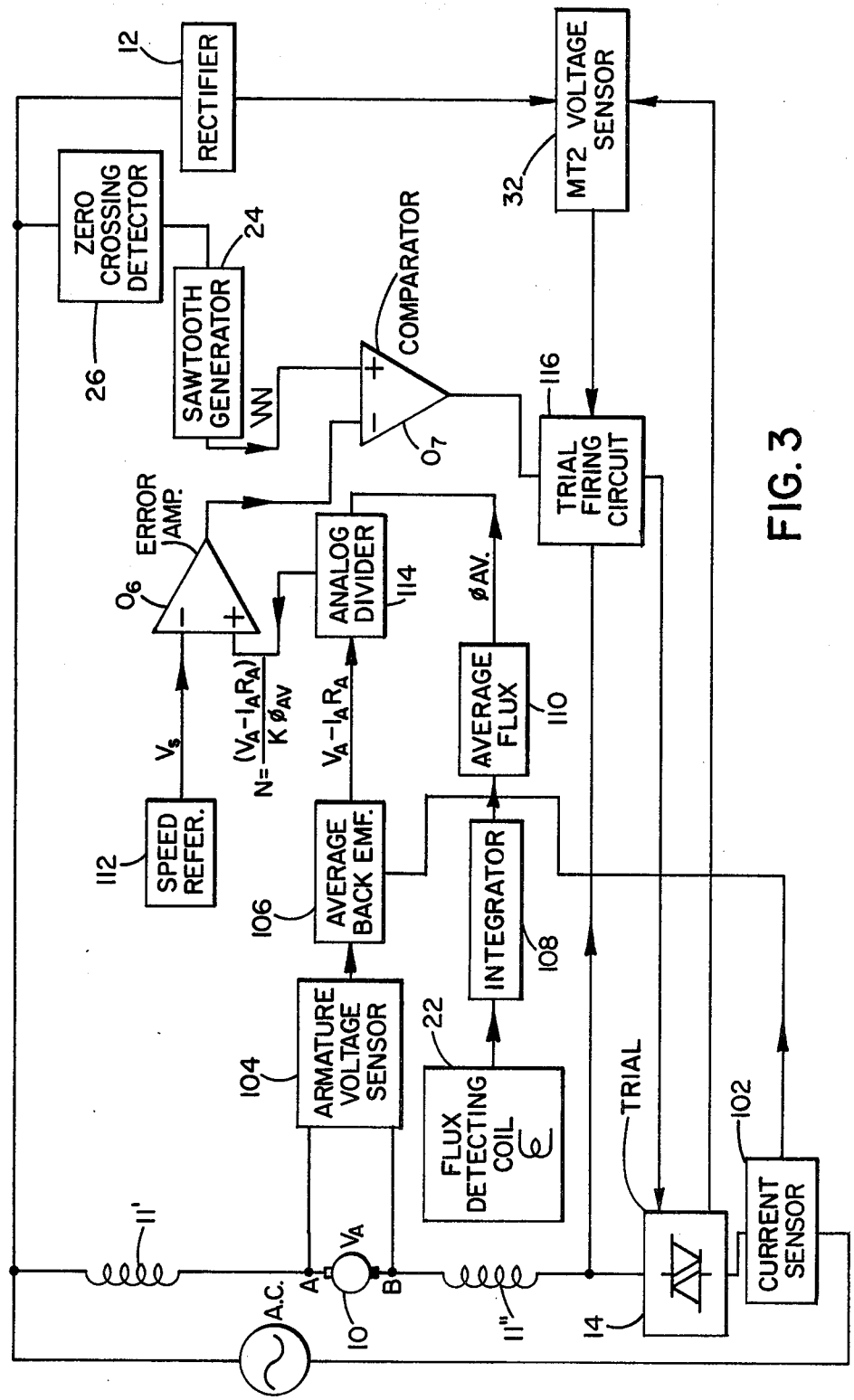

FIG. 3 is a block diagram of the circuit of FIG. 1.

The illustrated control means, including an automatic speed controller, is for a universal, series-wound, electrical motor having an armature indicated generally at 10, and field coils 11' and 11". An A.C. electrical supply, A.C., is provided for the system, this supply being of 240 volts, and having a frequency of 50 Hertz. The A.C. supply is rectified and smoothed before being supplied to the automatic speed controller, this rectifying and smoothing means being indicated generally at 12.

The control means also includes a triac 14, controlled by the automatic speed controller. The triac 14 is connected between the field coil 11" and one terminal of the A.C. supply for the system. The other terminal of the A.C. supply is connected to the other field coil 11'.

Control signals supplied by the controller to the triac 14 are synchronised with the A.C. electrical supply for the system, as described below. The average energy supplied to the motor in each period associated with the A.C. electrical supply is determined by the firing position of the triac in this period, the firing position, in turn, being determined by the automatic speed controller.

Under steady state conditions the control signals, or firing pulses, to the triac are such that the duration of the conduction periods of the triac during the positive half cycles of the supply for the system are substantially equal to those during the negative half cycles. Thus, if there are no even harmonics present in the supply, the waveforms of the armature voltage and current are both symmetrical about zero.

The illustrated rectifying and smoothing means 12 is connected across the A.C. supply for the system, and includes a rectifying diode D1 connected to one terminal of the A.C. supply, and is in series with resistors R1 and R2. Capacitors C1 and C2 are in parallel with the resistor R2, the capacitor C1 comprising a reservoir capacitor, and the resistor R2 and the capacitor C2 comprise a smoothing circuit. The voltage output of the means 12 is maintained constant by a Zener diode Z1 connected in parallel with the capacitor C2, one terminal of the Zener diode being maintained at one reference potential, for example, zero potential, and the other terminal of the Zener diode being maintained at another reference potential, for example, −5 volts.

The automatic motor speed controller derives signals, the voltages of which are representative of the instantaneous values for the armature speed N, in response to the signals having currents representative of the instantaneous armature voltages $v_a$, and of the instantaneous armature currents $i_a$, obtained in the manner described below. In particular, within the controller there is computed the solutions of the equation:

$$N = \frac{V_a - I_a R_a}{K \phi_{AV}} \qquad (1)$$

where $R_a$ is the resistance of the armature, K is a constant dependent upon the characteristics of the motor, $(V_a - I_a R_a)$ comprises, or is considered to be, the true average of the alternating quantity $(v_a - i_a R_a)$, and $\phi_{AV}$ comprises, or is considered to be, the true average flux value, and obtained in the manner referred to below.

The required control signals are supplied to the triac 14 by the controller, both in response to the controller receiving input signals, the current of each such input signal being representative of the instantaneous armature voltage $v_a$, and in response to the controller receiving input signals, the current of each such input signal being representative of the instantaneous armature current $i_a$. The instantaneous armature voltage $v_a$ is sensed by providing a resistor R3 connected at one end to a point A between the armature 10 and the field coil 11', and by providing a resistor R4 connected at one end to a point B between the armature 10 and the field coil 11". The instantaneous armature current $i_a$ is sensed by providing a small resistor R5 between the A.C. supply for the system and the common electrode MT1 of the triac 14, and by providing a resistor R6 connected to a point between the resistor R5 and the A.C. supply for the system.

It is convenient to consider that at any instant there is obtained a signal representative of the instantaneous armature voltage $v_a$, and a signal representative of the instantaneous armature current $i_a$.

The automatic speed controller has a rail 16 maintained at said one reference potential, for example, zero potential, by the rectifying and smoothing means 12. This potential is the datum potential in relation to which both the controller and the motor operate, the rail 16 being connected to a point between the common electrode MT1 of the triac 14 and the small resistor R5. Another rail 18 associated with the controller is maintained at said other reference potential, for example, −5 volts, by the rectifying and smoothing means 12.

The controller also includes a rail 20 maintained at a reference potential $V_{REF}$ of, for example, −2.5 volts, the rail 20 being connected to the rail 16 via a Zener diode Z2, and being connected to the rail 18 via a resistor R7.

The resistor R3 is connected to the inverting input of an operational amplifier O1, and the resistor R4 is connected to the non-inverting input of the amplifier. The inverting input is also connected to the rail 20 via a resistor R8; and the non-inverting input is also connected to the rail 20 via a resistor R9, and is connected to the rail 18 via an NPN transistor Q1. The output of the operational amplifier O1 is connected to the base of the transistor Q1. The resistors R3 and R4 are equal, and the resistors R8 and R9 are equal. The resistor R8 is small compared with resistor R3, its value being chosen to ensure that the voltage at the inverting input of the amplifier O1 is within the common mode range of the amplifier.

The base of the transistor Q1 is connected to the base of a matched NPN transistor Q2.

When the phase of the armature voltage is such that the instantaneous potential of the point A is more negative than the instantaneous potential of the point B, the inverting input of the operational amplifier O1 becomes more negative than the non-inverting input, and the amplifier output goes positive, turning ON the matched transistors Q1 and Q2. The collector current i1 of the transistor Q1 produces a voltage drop in the resistors R4 and R9, reducing the difference in potential between the two inputs of the amplifier O1. The gain of the amplifier is very large, and the difference in potential between its inputs remains very small, and therefore the current i1 is approximately equal to the instantaneous armature voltage $v_a$ divided by the resistance of R4. When the sense of the armature voltage reverses, transistors Q1 and Q2 are turned OFF.

Since Q1 and Q2 are matched transistors, the instantaneous collector current of the transistor Q2 is equal to i1.

The collector circuit of the transistor Q2 includes a resistor R10 and a transistor Q3 in series with each other, the transistor Q3 being connected to the rail 20. The collector of the transistor Q3 is connected to its base. A capacitor C3 is connected to a point between the transistor Q2 and the resistor R10, and to the rail 16.

The arrangement provided in relation to the sensed armature current $i_a$ has the small resistor R5 connected, via the point between the common electrode MT1 of the triac 14 and the resistor R5, to the inverting input of an operational amplifier O2, and the resistor R6 is connected to the non-inverting input. The non-inverting input is also connected to the collector of a transistor Q4, of a pair of matched transistors Q4 and Q5. The transistors Q4 and Q5 correspond to the transistors Q1 and Q2. The bases of the transistors Q4 and Q5 are connected together. The transistor Q4 is connected between the non-inverting input of the amplifier O2 and the rail 18; and the output of the amplifier O2 is connected to the bases of both transistors Q4 and Q5.

When the triac 14 is conducting on negative half cycles of the supply for the system, the flow of current in the small resistor R5 is such that the non-inverting input of the amplifier O2 is more positive than the rail 16 maintained at zero potential. Thus, a positive voltage is applied, via the resistor R6, to the non-inverting input of the amplifier O2, causing the output of the amplifier to go positive, turning ON the matched transistors Q4 and Q5. If the gain of the amplifier O2 is high, the collector current i2 of the transistor Q4 is such that the voltage drop i2R6 is approximately equal to the voltage drop $i_a$R5. Thus:

$$i_2 = i_a R5/R6$$

The instantaneous collector current of the transistor Q5 is equal to i2. During the positive half cycles of the supply for the system the output of the amplifier O2 goes negative, and the transistors Q4 and Q5 remain switched OFF.

The current i2 in the collector circuit of the transistor Q5 is subtracted from the current flowing in the collector of the transistor Q2 by a current mirror including matched PNP transistors Q6 and Q7. The bases and the emitters of the transistors Q6 and Q7 are connected together, the emitters are connected to the rail 16, and the collector and the base of the transistor Q6 are connected together, and are connected to the collector of the transistor Q5. The collector of the transistor Q7 is connected to a point between the transistor Q2 and the resistor R10. Thus, an instantaneous current i2 is subtracted from the instantaneous current i1 flowing into the capacitor C3. If the time constant C3.R10 is large compared with the period of the supply, and the motor is operated under steady state conditions, the current I1 flowing in the resistor R10 is the true average of (i1−i2) over the supply period, and thus:

$$I_1 = \frac{V_a}{2 \cdot R4} - \frac{I_a \cdot R5}{2 \cdot R6}$$

where $V_a$ is the true average armature voltage, and $I_a$ is the true average armature current. The factor 2 in the denominators arises because the currents i1 and i2 flow only during one half cycle of the supply. The ratio (R5/R6) is made equal to ($R_a$/R4) so that $$I_1 = \frac{V_a - I_a R_a}{2 \cdot R4}$$

A detector coil 22, comprising n turns of wire wrapped around one of the poles of the motor magnet, is provided. The voltage induced in the coil 22 is equal to:

$$n \cdot \frac{d\phi}{dt}$$

where $\phi$ is the instantaneous total magnetic motor flux per pole of the stator, and n is usually one or two. One end of the coil 22 is connected to the rail 20, and the other end is connected via a capacitor C4, and a resistor R11, to the inverting input of an operational amplifier O3. The non-inverting input of the amplifier O3 is connected to the rail 20. There is a negative D.C. feedback path for the amplifier O$_3$, comprising a capacitor C5 in parallel with a resistor R12. Resistor R11 is very much greater than the impedance of the capacitor C4 at 50 Hertz; and resistor R12 is very much greater than the impedance of the capacitor C5 at 50 Hertz. Thus, this part of the circuit arrangement operates as an integrator at frequencies of 50 Hertz, and above, and the output of the amplifier O$_3$ represents:

$$\int \frac{n}{C5 \cdot R11} \frac{d\phi}{dt} \cdot dt = \frac{n\phi}{C5 \cdot R11}$$

The resistor R12 and the capacitor C4 are arranged to ensure that the D.C. level of the output of the amplifier O$_3$ is maintained at the potential of the rail 20, the offset of the amplifier being assumed to be small.

The output of the amplifier O$_3$ is connected, via a resistor R13, to the non-inverting input of an operational amplifier O$_4$. The inverting input of the amplifier O$_4$ is connected to the rail 20. The non-inverting input of the amplifier O$_4$ is also connected to the rail 18, via a transistor Q8. The base of the transistor Q8 is connected to the base of a matched transistor Q9, and the bases of both transistors Q8 and Q9 are connected to the output of the amplifier O$_4$. The transistor Q9 is connected in series with a resistor R14, and a transistor Q10 having its collector connected to its base. This series combination is between the rails 20 and 18. A capacitor C6 is connected to a point between the transistor Q9 and the resistor R14, and to the rail 16.

When the output of the amplifier O$_3$ goes positive relative to the potential of the rail 20, the output of the amplifier O$_4$ goes high, turning ON transistors Q8 and Q9. The collector current of the transistor Q8 flows via the resistor R13 from the output of the amplifier O$_3$. If the gain of the amplifier O$_4$ is high, the voltage drop in the resistor R13 is very nearly equal to the output voltage of the amplifier O$_3$ relative to the potential of the rail 20, the collector current of the transistor Q8 being approximately equal to the output voltage of the amplifier O$_3$, divided by the resistance R13. Since the transistors Q8 and Q9 are identical their collector currents are equal, and if the time constant C6.R14 is long compared with the supply period, and the motor is operating under steady state conditions, the current I$_2$ flowing in the resistor R14 is equal to the true average current in the collector of the transistor Q9 over the supply period. Hence:

$$I_2 = \frac{n\phi_{AV}}{2 \cdot C5 \cdot R11 \cdot R13}$$

where $\phi_{AV}$ is the true average flux in the magnetic circuit of the motor.

The arrangement in relation to the connections of the coil 22 is such that the output of the amplifier O$_4$ is positive during the half cycle of the supply when the point A on the armature is more negative than the point B, so that any ripples in the currents I$_1$ and I$_2$ are in phase.

When the output of the amplifier O$_3$ goes negative relative to the potential of the rail 20, the transistors Q8 and Q9 are switched OFF.

The circuit arrangement also includes an analogue dividing arrangement, including a matched, long-tailed pair of NPN transistors Q11 and Q12, comprising a pair of transistors in a differential circuit configuration. The collector loads of the transistors Q11 and Q12 comprise, respectively, resistors R15 and R16, and these resistors are connected to the rail 16. An operational amplifier O$_5$ is provided so that its non-inverting input is connected to a point between the collector of the transistor Q11 and the collector load resistor R15. The inverting input is connected to the rail 20. The output of the operational amplifier O$_5$ is connected to the base of a transistor Q13 between the commoned emitters of the transistors Q11 and Q12, and the rail 18. The two inputs to the analogue dividing arrangement are provided by connecting the bases of the transistors Q11 and Q12, respectively, to the point between the resistor R10 and the transistor Q3, to receive the current I$_1$, and to the point between the resistor R14 and the transistor Q10, to receive the current I$_2$. The output of the analogue dividing arrangement is taken from a point between the collector of the transistor Q12 and the collector load R16. The base currents of the transistors Q11 and Q12 are small.

The tail current of the long-tailed pair Q11 and Q12 is controlled by the amplifier O$_5$ and the transistor Q13.

The transistors Q3 and Q10 are also matched; and the current gains of these transistors, and those of the long-tailed pair Q11 and Q12, are high. Thus:

(I$_1$/I$_2$) is approximately (I$_4$/I$_3$)

where I$_3$ is the current flowing in the collector circuit of the transistor Q11, and I$_4$ is the current flowing in the collector circuit of the transistor Q12.

Operational amplifier O$_5$ compares the voltage drop across the resistor R15 with the potential V$_{REF}$ of the rail 20. The gain of the amplifier O$_3$ is high; and the tail current of the long-tailed pair of transistors Q11 and Q12 is controlled so that the voltage drop across the resistor R15 is always equal to the potential V$_{REF}$ of the rail 20. Hence:

$$I_3 = \frac{V_{REF}}{R15}$$

The resistors R15 and R16 are equal. The D.C. voltage drop v across the resistor R16 is:

$$v = \frac{I_1}{I_2} \cdot V_{REF}$$

$$= \frac{(V_a - I_a R_a) C5 \cdot R11 \cdot R13 \cdot V_{REF}}{n\phi_{AV} \cdot R4}$$

and, thus, represents the equation:

$$N = \frac{V_a - I_a R_a}{K \phi_{AV}} \quad (1)$$

Hence, v so desired, represents N, the instantaneous motor armature speed.

Within the automatic motor speed controller, the derived D.C. voltage v is compared with a speed reference signal, the voltage V$_s$ of which is representative of a predetermined armature speed. This speed reference signal V$_s$ is obtained by control-point-determining means of the controller, by providing a potentiometer RV1 between the rails 16 and 20, and in parallel with the Zener diode Z2. A resistor R17 is connected in series with the wiper of the potentiometer RV1. The speed reference signal V$_s$ is supplied at the end of the resistor R17 remote from the wiper. The setting of the control-point-determining means, and hence the predetermined armature speed, can be varied at will by an operator, by altering the position of the wiper of the potentiometer RV1.

Also within the automatic motor speed controller, the voltage v of each derived signal, and the speed reference signal $V_s$, are compared by an error amplifier $O_6$, having a negative feedback path comprising a capacitor C7, the derived signal v being supplied to the non-inverting input of the error amplifier $O_6$, and the speed reference signal $V_s$ being supplied to the inverting input. Any difference between the voltages of the instantaneous derived and speed reference signals, representative of any difference between the detected and predetermined armature speeds, respectively, is represented by the corresponding error, output signal from the error amplifier $O_6$, and is supplied to one input of a comparator $O_7$. The other input of the comparator $O_7$ is connected to the output of a sawtooth generator 24.

Within the sawtooth generator 24, a constant current is supplied to a capacitor C8 by a circuit mirror comprising matched transistors Q14 and Q15, and a resistor R18. The resistor R18 and the transistor Q14 are in series between the rails 16 and 18; and the capacitor C8 and the transistor Q15 are also in series between the rails 16 and 18. The bases of the two transistors are connected together; and the collector of the transistor Q14 is connected to its base. The capacitor C8 is connected to the non-inverting input of the comparator $O_7$, and provides thereto a linear negative-going ramp voltage. A point between the capacitor C8 and the amplifier $O_O$ is connected to a zero crossing detector 26 of the supply for the system, via a transistor Q16 and a resistor R19. The emitter of the transistor Q16 is connected to the point between the capacitor C8 and the comparator $O_7$, and the collector is connected to the rail 16. The base of the transistor Q16 is connected to the zero crossing detector 26; and the resistor R19 is connected between the base of the transistor Q16 and the rail 16.

The zero crossing points of the A.C. supply for the system are detected by part 26 of the illustrated circuit arrangement comprising a resistor R20 connected to one terminal of the A.C. supply. The resistor R20 is connected also to the rail 18 via a transistor Q17. The collector of the transistor Q17 is connected to its base; and the base of the transistor Q17 is connected to the base of a matched transistor Q18. The transistor Q18 is in series with a resistor R21, between the rails 16 and 18. Also connected in series with each other, between the rails 16 and 18, is a resistor R22 and the base-collector junction of a transistor Q19, the base of the transistor Q19 being connected to the rail 18. The emitter of the transistor Q19 is connected to the base of the transistor Q18. A two-input NAND gate 28 is provided, one input being connected to a point between the resistor R21 and the transistor Q18, and the other input is connected to a point between the resistor R22 and the transistor Q19. The output of the NAND gate 28 is connected to the base of a transistor Q20. The transistor Q20 is in series with the resistor R19 of the sawtooth generator 24, between the rails 16 and 18.

During the positive half cycles of the supply for the system the current flowing in the resistor R20 is mirrored in the resistor R21. During the negative half cycles of the supply for the system the current flowing in the resistor R20 flows from the emitter of the transistor Q19, causing a similar current to flow in the resistor R22.

The transistor Q18 saturates when the instantaneous value of the supply voltage is approximately:

$$+5 \cdot \frac{R20}{R21} - 4.3 \text{ volts}$$

The transistor Q19 saturates when the instantaneous value of the supply voltage is approximately:

$$-5 \cdot \frac{R20}{R22} - 5.7 \text{ volts}$$

The resistors R20, R21 and R22 are chosen such that the transistor Q18 saturates when the supply voltage is more positive than, for example, +10 volts, and transistor Q19 saturates when the supply voltage is more negative than, for example, +10 volts.

Thus, the two inputs of the NAND gate 28 are both high, and the NAND gate output is low, only when the instantaneous value of the supply voltage is between +10 volts and -10 volts, and the transistor Q20 is held switched OFF. It can be considered that the transistor Q20 is switched OFF for a short period each time the supply voltage passes through zero. The capacitor C8 discharges rapidly through the transistor Q16 when the transistor Q20 is switched OFF. The voltage across the capacitor C8 is, consequently, a 100 Hertz sawtooth wave synchronised with the 50 Hertz supply voltage.

The difference between each instantaneous error signal from the amplifier $O_6$, and the instantaneous value of the sawtooth waveform from the capacitor C8, is determined by the comparator $O_7$, and is amplified by the comparator.

The output of the comparator $O_7$ is connected to one input of a two-input NOR gate 30, and the other input of the NOR gate 30 is connected to means 32 sensing the instantaneous voltage on the electrode MT2 of the triac 14. The means 32 comprises a resistor R23 and a transistor Q21 in series between the electrode MT2 of the triac and the rail 18. The collector of the transistor Q21 is connected to the base, and the base is also connected to the base of a matched transistor Q22. The transistor Q22 is in series with a resistor R24 between the rails 16 and 18. The base of the transistor Q21 is also connected to the emitter of a transistor Q23; the base-collector junction of the transistor Q23 and the resistor R25 being in series with each other between the rails 16 and 18. A point between the resistor R24 and the transistor Q22 is connected to one input of a two input NOR gate 34 via an inverter 36. A point between the resistor R25 and the transistor Q23 is connected to the other input of the NOR gate 34 via a second inverter 38. The output of the NOR gate 34 of the means 32 is connected to the second input of the NOR gate 30.

The resistors R23, R24 and R25 are such that the transistor Q22 saturates when the voltage on the electrode MT2 of the triac 14 is more positive than +10 volts; and the transistor Q23 saturates when the voltage on the electrode MT2 of the triac is more negative than -10 volts. Thus, when the voltage on the electrode MT2 of the triac is not between ±10 volts, the input of one of the inverters 36 or 38 is low, This puts a logical "1" on one of the inputs of the NOR gate 34. This causes a logical "0" on one input of NOR gate 30. Hence, the output of the NOR gate 34 is low if the triac 14 is in the non-conducting state.

When the instantaneous voltage of the sawtooth waveform becomes more negative than the output of the error amplifier $O_6$, the other input of the NOR gate 30 goes low.

When both inputs of the NOR gate 30 are low, the output of the NOR gate goes high, triggering a monostable device 40.

The monostable device 40 is connected to the base of an NPN transistor Q24. The emitter of the transistor Q24 is connected to the rail 18, and the collector is connected to the gate of the triac 14, via a resistor R26. The arrangement is such that, when the monostable device 40 is triggered, turning ON the transistor Q24, a corresponding control signal, comprising a pulse of current, say, for 100 microseconds, is supplied to the gate of the triac, causing the triac to turn ON. The gate current is determined by the resistor R20. The triac remains switched ON until the current in the motor windings 11' and 11" falls to zero, slightly after the supply voltage is zero. The triac is triggered again at a similar point in the next half cycle of the supply for the system, when the 100 Hertz sawtooth waveform again goes more negative than the output of the error amplifier $O_6$. Hence, the control signals from the monostable device 40 determine the firing positions of the triac 14 in each half cycle of the supply for the system, and in each cycle of the sawtooth generator output.

In the operation of the system, for example, if the armature speed falls, due to any increase in load applied to the motor, the potential v of the derived signal, across the resistor R16, falls in accordance therewith. The potential of the error signal from the amplifier $O_6$ increases. The triac firing pulses therefore are generated earlier in each cycle of the sawtooth generator output, so that the average energy supplied to the motor is greater in each half cycle of the A.C. supply to the motor, and the motor speed is increased. In this way the average of the periodic electrical energy supplied to the motor, in each period associated therewith, can vary between consecutive periods, so as to tend to reduce automatically any detected difference between the derived and the predetermined armature speed.

The gain of the error amplifier $O_6$ is sufficiently high, so that the derived voltage v and the speed reference voltage $V_s$, both supplied to the error amplifier, are at least substantially equal under steady state conditions.

The maximum value of the speed reference voltage $V_s$ is equal to $V_{REF}$, which thus corresponds to the maximum motor speed.

Thus: $C \, V_{REF} = N_{MAX}$, where C is a constant.
Since $$v = \frac{(V_a - I_a R_a) \cdot C5 \cdot R11 \cdot R13 \cdot V_{REF}}{n \, \phi_{AV} \cdot R4}$$

and $$N = \frac{V_a - I_a R_a}{K \phi_{AV}}$$

$$v = \frac{N \cdot K \cdot C5 \cdot R11 \cdot R13 \cdot V_{REF}}{n \, R4}$$

When $N = N_{MAX}$ and $v = V_{REF}$ $$K = \frac{n \, R4}{C5 \cdot R11 \cdot R13 \cdot N_{MAX}}$$

and also $$R6 = \frac{R5 \cdot R4}{R_a}$$

Thus, if the values of $R_a$ and K are known, and the full load current of the motor and the maximum required speed are also known, suitable values for R3, R4, R5, R6, R11, R13 and C13 can be chosen.

The automatic speed controller may be at least partially embodied within a monolithic semiconductor device. The Zener diode Z1 may be replaced by a shunt regulator within the semiconductor device, if desired.

When the motor is not operating under steady state conditions, and control signals are provided to the control means, inherently the currents $I_1$ and $I_2$ do not represent the true averages of the alternating quantities, respectively, $(v_a - i_a R_a)$, and $\phi$, but only approximations of the true averages, and possibly comprise the same proportions of the two true averages, but are considered as being derived from the true averages.

The time constants associated with the two rectifying and filtering means may not be long compared with the period of the A.C. electrical supply to the motor, in which case the time constants are required to be closely matched.

Common means may be provided for the derivation of the signals representative of the quantities $(V_a - I_a R_a)$, and $\phi_{AV}$, from the instantaneous armature voltages $v_a$, and the instantaneous armature currents $i_a$.

The required true average values of the alternating quantities $(v_a - i_a R_a)$, and $\phi$, may be derived by full wave rectification and filtering. Thus, the time constants associated with the circuit arrangement, for example, may be reduced by one half, and the automatic motor speed controller may have a faster response.

The automatic motor speed controller may be varied in several other ways, and particular modifications, by way of example, are referred to below.

There may be computed within the controller other suitable derivatives of equation (1) set out above.

The analogue divider provided may have any convenient form.

The arrangement may be such that a digital divider is provided.

Whilst it is advantageous to have signals the currents of which represent desired values, at least some such values may be represented by signal voltages.

Any generated error signal may be employed in any convenient way to cause control signals to be provided to the triac, instead of the illustrated arrangement.

The control-point-determining means of the automatic motor speed controller may have any convenient form.

The error amplifier $O_6$ may include components such as capacitors and resistors, so that its frequency response can be adjusted, to obtain stable operation of the system, and/or to optimise the dynamic performance of the system.

The low voltage D.C. supply of the automatic motor speed controller may be provided by means other than by the rectification and smoothing of the alternating supply to the motor. The supply may be of any appropriate voltage.

Instead of a single coil 22, a number of coils may be used, the sum of the induced voltages in the coils being integrated in order to obtain a voltage proportional to the instantaneous flux. The coils may be wound around the poles of the motor stator; or around the iron of the stator, between the poles.

Instead of obtaining a voltage proportional to the instantaneous flux in any one of the ways referred to above, such signals may be derived by integrating the voltage $V_F$ developed across one of the field coils 11' or 11" of the motor with respect to time; with:

$$V_F = n_F \frac{d\phi}{dt} + i_a R_F$$

where $n_F$ is the number of turns in the field coil winding, and $R_F$ is the ohmic resistance of the field coil. It is therefore necessary first to subtract a voltage equal to $i_a.R_F$ from the voltage $V_F$ across the field coil before performing the integration, for example, by employing the circuit arrangement of FIG. 2, comprising a modification of part of the circuit arrangement of FIG. 1.

Thus, the amplifier O$_3$, and the associated capacitor C4, and resistor R11, of the arrangement of FIG. 1, instead of being connected to a coil 22, are connected to the output of an operational amplifier O$_8$, as shown in FIG. 2. The non-inverting input of an amplifier O$_8$ is connected via a resistor R30 to the point B between the field coil 11" and the motor armature 10, via a resistor R32 to the supply end of the small resistor R5, and via a resistor R31 to the rail 20. The inverting input of the amplifier O$_8$ is connected via a resistor R33 to the end of the field coil 11" adjacent to the MT2 electrode of the triac 14, via a resistor R35 to the rail 16, and via a resistor R34 to the output of the amplifier O$_8$. The non-inverting input of the amplifier O$_3$ is connected directly to the rail 20.

If the gain of the amplifier O$_8$ is large, and if the resistor R30 is identical with the resistor R33, the resistor R31 is identical with the resistor R34, and the resistor R32 is identical with the resistor R35, the output voltage of the amplifier O$_8$ is:

$$V_F \cdot \frac{R31}{R30} - i_a \cdot R5 \cdot \frac{R31}{R32}$$

$$\text{If } \frac{R_F}{R30} = \frac{R5}{R32},$$

the output voltage of the amplifier O$_8$ is:

$$(V_F - i_a R_F) \cdot \frac{R31}{R30}$$

This output voltage is integrated by the integrator comprising the amplifier O$_3$, the capacitors C4 and C5, and the resistors R11 and R12.

The output of the integrator is:

$$\frac{R31}{R30} \int \frac{(V_F - i_a R_F)}{C5 \cdot R11} dt = \frac{n_F \cdot \phi \cdot R31}{C5 \cdot R11 \cdot R30}$$

and the current $$I_2 = \frac{n_F \cdot R31 \cdot \phi_{AV}}{2 \cdot C5 \cdot R11 \cdot R13 \cdot R30}$$

The armature voltage, current and flux may be sampled during only part of the period of the supply voltage. In one such arrangement the outputs of the amplifiers O$_1$, O$_2$ and O$_4$ are maintained at the potential of the rail 18 except during the sampling period. Thus, the currents I$_1$ and I$_2$ are proportional, respectively, to the average armature voltage, and the average flux during the sampling period, multiplied by the sampling time, and divided by the supply period. If the sampling period is during the time when the triac is not conducting, and if the voltage proportional to the flux is not derived by integrating the voltage $V_F$ developed across one of the field coils of the motor, it is unnecessary to scale the motor current, and the resistors R5 and R6, the amplifier O$_2$, and the transistors Q4, Q5, Q6 and Q7 are omitted.

The block diagram of FIG. 3 is useful in understanding the circuit detailed at FIG. 1. Those components of FIG. 3 which are explicitly labelled in FIG. 1 have the same label as with FIG. 1, whereas those blocks of FIG. 3 which are not labeled as such in FIG. 1 have been numbered with numbers greater than 100.

The A.C. supply for the system is connected across the motor armature 10, field coils 11' and 11", triac 14, and current sensor 102. An armature voltage sensor 104 provides an armature voltage signal to an average back e.m.f. circuit 106 which also receives a signal based on the current sensed by current sensor 102. The output of the average back e.m.f. circuit 106 is fed into analog divider 114.

The flux detecting coil 22 feeds a signal to integrator 108 which integrates the flux over each supply period. The output of the integrator 108 is fed into average flux circuit 110 which generates an average flux signal fed into analog divider 114.

The analog divider 114 generates an output based upon the ratio of the average back e.m.f. to the average flux. This output of $(V_a - I_a R_a)/K\phi_{AV}$ where K is a constant is supplied to one input of the error amplifier O$_6$. The other input of the error amplifier O$_6$ is connected to a speed reference circuit 112.

Any error signal produced by the output of error amplifier O$_6$ is indicative of a difference between the desired speed and the calculated speed as determined by the analog divider 114. The error signal is supplied to one input of the comparator O$_7$. The other input of comparator O$_7$ is supplied by a sawtooth waveform from sawtooth generator 24. The output of sawtooth generator 24 is derived from detecting the zero crossing points of the A.C. supply by way of zero crossing detector 26.

The output of the comparator O$_7$ is representative of the difference between the instantaneous error signal and the instantaneous value of the sawtooth waveform and is used to control the triac firing circuit 116. In particular, the output of the comparator O$_7$ is used to determine the firing positions of the triac 14 in each half cycle of the supply for the system such that the motor speed is maintained at the required speed as determined by the speed reference circuit 112. The triac firing circuit also receives an output from the MT2 voltage sensor 32 which senses a voltage from the triac 14 and is also connected to the rectifier 12.

What I claim is:

1. A system including an automatic speed controller for a universal, series-wound, electrical motor, the motor to be energised by an A.C. electrical supply, from control means comprising a triac with phase angle control, the control means being arranged to be controlled, in turn, by the automatic motor speed controller, and the system also including computing means having rectifying and filtering means, and responsive to input signals having a parameter the magnitudes of which are representative of instantaneous armature voltages $v_a$, input signals having a parameter the magnitudes of which are representative of instantaneous armature currents $i_a$, and input signals having a parameter the magnitudes of which are representative of instantaneous flux values in the magnetic circuit of the motor, in response to such input signals the computing means to derive signals, each such derived signal comprising a D.C. voltage having a magnitude which is at least substantially representative of the armature speed N, from the solution of the equation:

$$N = \frac{V_a - I_a R_a}{K \phi_{AV}},$$

where $R_a$ is the resistance of the armature, K is a constant depending upon the motor design, and $(V_a - I_a R_a)$ is the true average of the alternating quality $(v_a - i_a R_a)$, and $\phi_{AV}$ is the true average flux value, the controller including means to compare each such derived signal with a reference signal provided by control-point-determining means of the controller, each reference signal having a parameter the magnitude of which is representative of a predetermined armature speed, in response to the comparing means detecting any difference between the armature speed represented by the derived signal and the predetermined armature speed represented by the reference signal, the comparing means provides an error signal, causing a control signal to be provided to the control means, and, in turn, there is caused to be supplied to the motor the required average of the A.C. electrical energy, the electrical energy to be supplied to the motor in each half cycle associated therewith to vary between consecutive half cycles, so as to tend to reduce any detected difference between the derived and the predetermined armature speeds.

2. A system as claimed in claim 1 arranged such that the input signals to the computing means representative of instantaneous flux values, in the magnetic circuit of the motor, comprise voltages directly proportional to the flux values, the voltages being derived from the time integral of the voltage induced within a coil wrapped around one of the poles of the stator of the motor, the coil being included within the system.

3. A system as claimed in claim 1 arranged such that the input signals to the computing means representative of instantaneous flux values, in the magnetic circuit of the motor, are derived from the time integral of the voltage developed across a field coil of the motor, a voltage equal to the product of the instantaneous motor current and the resistance of the field coil being subtracted from the instantaneous voltage developed across the field coil before the integration is performed.

4. A system as claimed in claim 1 in which the computing means includes an analogue dividing arrangment.

5. A system as claimed in claim 4 in which the analogue dividing arrangement includes a pair of transistors in a differential circuit configuration.

6. A system as claimed in claim 1, the arrangement being such that signal currents represent the magnitudes from which the required solutions of the equation are derived.

* * * * *